March 26, 1968 URS B. FURRER ET AL 3,374,974
CAMERA-SUPPORTING MEANS
Filed May 16, 1966 3 Sheets-Sheet 1
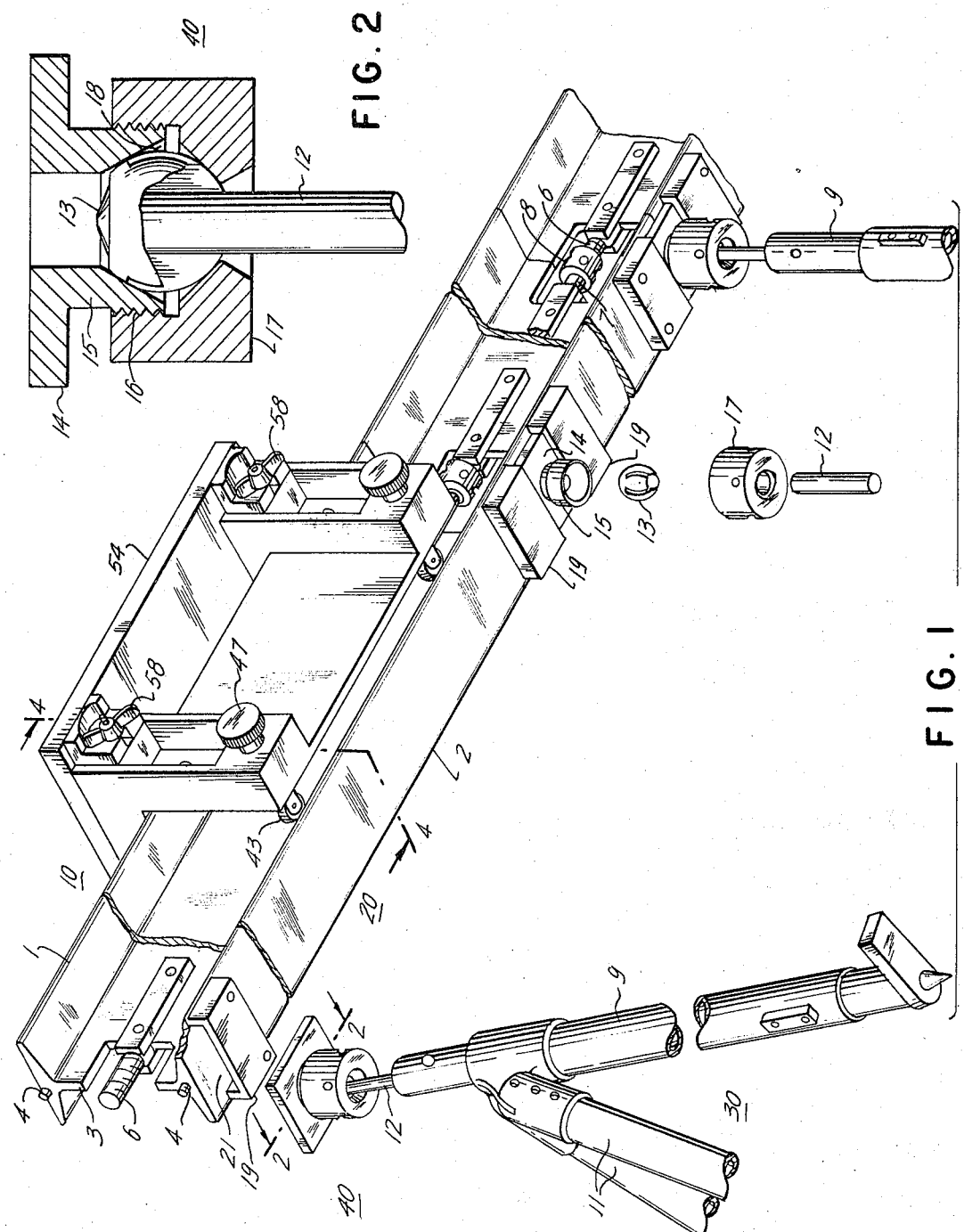
INVENTOR.
URS B. FURRER
RONALD M. LAUTORE
BY
Joseph Hirshfield
ATTORNEY March 26, 1968 URS B. FURRER ET AL 3,374,974
CAMERA-SUPPORTING MEANS
Filed May 16, 1966 3 Sheets-Sheet 3

INVENTOR.
URS B. FURRER
RONALD M. LAUTORE

Joseph Hirshfield
ATTORNEY 3,374,974
CAMERA-SUPPORTING MEANS
Urs Beat Furrer, Tarrytown, N.Y. (Carleton Ave., Briarcliff Manor, N.Y. 10510), and Ronald Martin Lautore, New York, N.Y. (2500 Johnson Ave., Riverdale, N.Y. 10471)
Filed May 16, 1966, Ser. No. 550,426
6 Claims. (Cl. 248—13)

ABSTRACT OF THE DISCLOSURE

A camera-supporting dolly for riding on an extended track. Several mutually perpendicular and adjustable guide wheels are provided in the dolly to prevent the dolly from lifting off the track or tilting with respect to the track, thereby minimizing unwanted shaking and vibration of the dolly.

---

This invention relates to means for supporting and positioning motion picture cameras and in particular to a camera-supporting dolly and track assembly and its use in setting up a moving camera shot.

In the motion picture making industry it is essential that the motion picture camera be given mobility without depriving the camera man and director of the complete control they desire over the particular angles and distances between the camera and the scene being photographed. A modern motion picture making studio has elaborate equipment for achieving this result. However, in recent times more and more motion pictures are being made "on location," i.e. out-of-door scenes are being photographed out-of-doors in natural surroundings. There, one has a problem of keeping the camera level as it is moved with respect to the subject being photographed. There is, in use, a large truck which rides on rubber wheels and on which the camera rides. The obvious problem with this truck is that if the floor on which it rides is not level, the camera will not be level with the possible result of a distorted picture. To overcome this shortcoming, a portable floor must be laid to provide a level surface for the camera truck to ride on. These floors and camera trucks are bulky, heavy and difficult and expensive to transport from location to location. In addition, it is quite time consuming to set up the level floor and in an industry such as the motion picture making one where to an almost unbelievable extent wasted time is wasted money, it is vital that wasted time be kept to a minimum.

It is therefore an object of this present invention to provide improved means for positioning a motion picture camera.

It is a further object of this present invention to provide an improved dolly for supporting a motion picture camera.

It is a further object of this present invention to provide a camera-supporting dolly and track assembly to facilitate the taking of motion pictures with a moving camera.

It is a further object of this present invention to provide simple and transportable means for setting up a camera out of doors on unlevel terrain.

These and other objects of this invention are achieved by a camera-supporting dolly, lightweight enough for one man to carry easily, which rides on a sectional track made from I beams. The I beams are supported on tripods and leveling means are provided so that the track can be made either level or tilted at any desired angle. By using this invention it is possible to set up quickly the I beam track on any type of terrain, even over small bodies of water, place the camera-supporting dolly on the track, take the picture and tear down and transport the track and dolly to a new location.

Another feature of the invention is a dolly comprising a U-shaped member of a design to effectively straddle an I beam track placed therethrough. The U-shaped member has several guide wheels therein which ride on different surfaces of the track. The guide wheels are capable of adjustment so that a snug fit can be obtained between the dolly and the track.

Another feature of the invention is that at least some of the guide wheels are spring-biased so that the snug fit will be maintained during the movement of the dolly along the track.

Other features and advantages of the invention will be readily apparent from the following description taken in connection with the accompanying drawing wherein:

FIGURE 1 is a worm's-eye isometric and partially exploded view of a camera dolly on a rail track in accordance with this invention.

FIGURE 2 is a sectional view of a ball joint used in this invention taken at 2—2.

Figure 5:
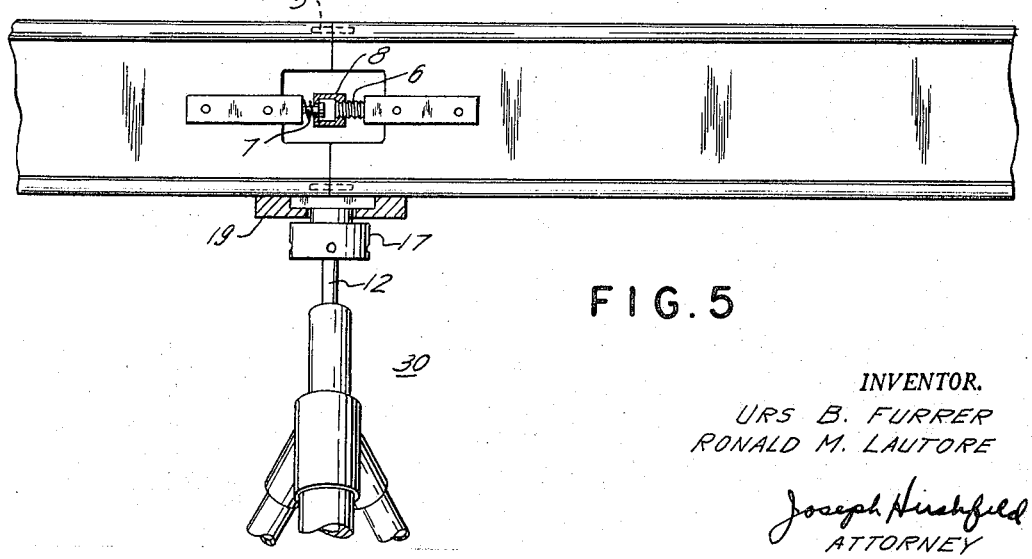
FIGURE 5 is a side elevation of the rail track.

In FIGURE 1 of the drawing, the camera dolly, represented generally at 10 is shown in cooperation with the track 20. As indicated, the track is an I beam having flanges 1 and 2 joined by web 3. Advantageously, the I beam track is of a lightweight, strong material such as magnesium and consists of separable sections joined together at lengths that are convenient for transportation purposes. As can be seen in FIGURES 1 and 5, one end of each section of track is provided with locating pins 4 in flanges 1 and 2 which are located to fit into locating holes 5 in the opposite end of the adjacent section of track. Also, one end of each section of track has a threaded stud 6 suitably fastened to a central portion of web 3, the stud extending in a direction parallel to said web. The opposite end of each track section has a bolt 7 suitably fastened to a central portion of its web, the bolt web. The opposite end of each track section has a bolt 7 has rotatably mounted thereon a sliding collar 8 with internal threads which threads are matable with threaded stud 6. To join two sections of track, locating pins 4 are inserted into locating holes 5, resulting in threaded stud 6 being opposite sliding collar 8. Collar 8 is then slid along bolt 7 until it meets with stud 6 at which time collar 8 is rotated in a direction permitting stud 6 to move into the collar thereby completing the joint and making it secure.

The track is supported by means of tripods 30 attached thereto by means of a ball joint indicated generally at 40. Tripod 30 primarily comprises one main leg 9 and two secondary legs 11 pivotally attached to the main leg 9, each leg being telescoping in nature to provide for adjustments. The top end of main leg 9 is provided with a shaft 12 of such diameter that it will cooperate with ball 13 of ball joint 40.

Ball joint 40 comprises a flat plate 14 having a cylindrical portion 15 projecting from a central region thereof. The cylindrical portion 15 has external threads 16 designed to mate with internal threads of a nut like collar 17 when collar 17 is rotated on portion 15. Cylindrical portion 15 and collar 17 define a chamber 18, the actual volume of which decreases as collar 17 is rotated on cylindrical portion 15. Ball joint 40 is further provided with ball 13 which has a cavity therein of a dimension and design to accommodate shaft 12. When collar 17 is in a loosened condition, i.e. before it is rotated on cylindrical portion 15 to any substantial degree, ball 13 is free to rotate within chamber 18. As collar 17 is tightened, i.e., rotated on cylindrical portion 15, chamber 18 decreases in volume enough to prevent ball 13 from further rotation. Therefore the relative angle between shaft 12 and flat plate 14 can be adjusted while collar 17 is in a loosened condition and becomes unadjustable when collar 17 is tightened.

Ball joint 40 is attached to track 20 by means of restraining bars 19 positioned near each end of each section of the track. Restraining bars 19 are suitably fastened to the underside of the track section and provide rectangularly shaped cavities 21 of a design adapted to cooperate with flat plate 14 of the ball joint 40. As adjacent sections of the track are joined together, flat plate 14 is fitted into the cavities 21 defined by restraining bars 19 and flange 2 and is securely held in place thereby. When the sections of track are separated, flat plate 14 easily slides out of cavities 21 and can be separated from the track.

Track 20 can also be provided with leveling means, such as bubble levels (not shown). These are used to set the sections of track in their desired positions, i.e. level or at any desired angle. Alternatively, means separate from the track can be used to level or properly position the track.

To set up the above described apparatus for a moving camera shot, first the tripods are positioned along the projected path of the track at intervals corresponding approximately to the length of the track sections. Next the sections of track are placed on the tripods so that the flat plates 14 of the ball joints fit loosely into the cavities of the restraining bars 19. After this is done, the locating pins 4 and holes 5 are aligned and sliding collar 8 is brought into contact with threaded stud 6 and rotated to mate the threads and complete the joint. At the same time, it will be observed that the ball joint 40 is securely held by the restraining bars 19. At this point, the tripods, ball joints and sections of track are securely, but removably, connected to one another. By loosening the collar 17 of the ball joint, the angle of the track with respect to the horizontal as observed by leveling means (not shown) can be adjusted as desired. By tightening the collar 17, the track will be held at this angle for as long as necessary.

Camera dolly 10 comprises a U-shaped channel member 22 with a U-shaped flange-like member 23, at each end, the assembly providing a U-shaped tunnel through which the track passes.

The cross piece 24 of each U-shaped flange-like member 23 is provided with a removable main load carrying wheel 25, the rolling surfaces 26 of which extend into the tunnel. Wheel 25 has bearings 27 and rides on shaft 28 intermediate a plurality of plate springs 29 which serve to absorb any lateral wobbling of wheel 25. Shaft 28 is held in place by nut 31. Access to shaft 28 is obtained by removing screws 32 and subsequently blocks 33, held in place by said screws 32. By loosening nut 31 and withdrawing shaft 28, wheel 25 can be removed from cross piece 24. This permits different main load carrying wheels of different load supporting capacities to be interchangeably used in the dolly.

Each leg portion 34 of each U-shaped member 23 is provided with a first guide wheel 35 located at that region of leg portion 34 nearer cross piece 24. Wheel 35 is rotatable about an axle 36 that extends generally transverse to leg portion 34 and extends into the tunnel. Axle 36 is attached to a disc-like link 37 so that the axis of rotation of axle 36 is parallel to but spaced from the axis of rotation of link 37. Link 37 is also attached to shaft 38 which is held in place by nut 39. The axis of rotation of shaft 38 coincides with the axis of rotation of link 37. When nut 39 is loosened, shaft 38 is rotatable by means of slot 41. As shaft 38 is rotated, the eccentricity of shaft 38 and axle 36 will impart some degree of vertical motion to wheel 35. By these means, rolling surface 42 of wheel 35 is positioned in contact with the inner surface of top flange 1 of track 20. Rolling surface 42 is advantageously tapered to provide maximum contact with flange 1.

Each leg portion 34 of each U-shaped member 23 is also provided with a second guide wheel 43 located at that region of leg portion 34 removed from cross piece 24. Wheel 43 is rotatable about an axis substantially transverse to cross piece 24 so that its rolling surface 44 is in contact with web 3. Wheel 43 is mounted at the bifurcate end 45 of support 46 so that its axis of rotation is substantially transverse to the length of support 46. Support 46, and accordingly wheel 43, are adjustable laterally by means of knob 47. Once a proper contact is made between rolling surface 44 and web 3, the position of support 46, and hence wheel 43, is locked by means of locking screws 48.

Figure 4:
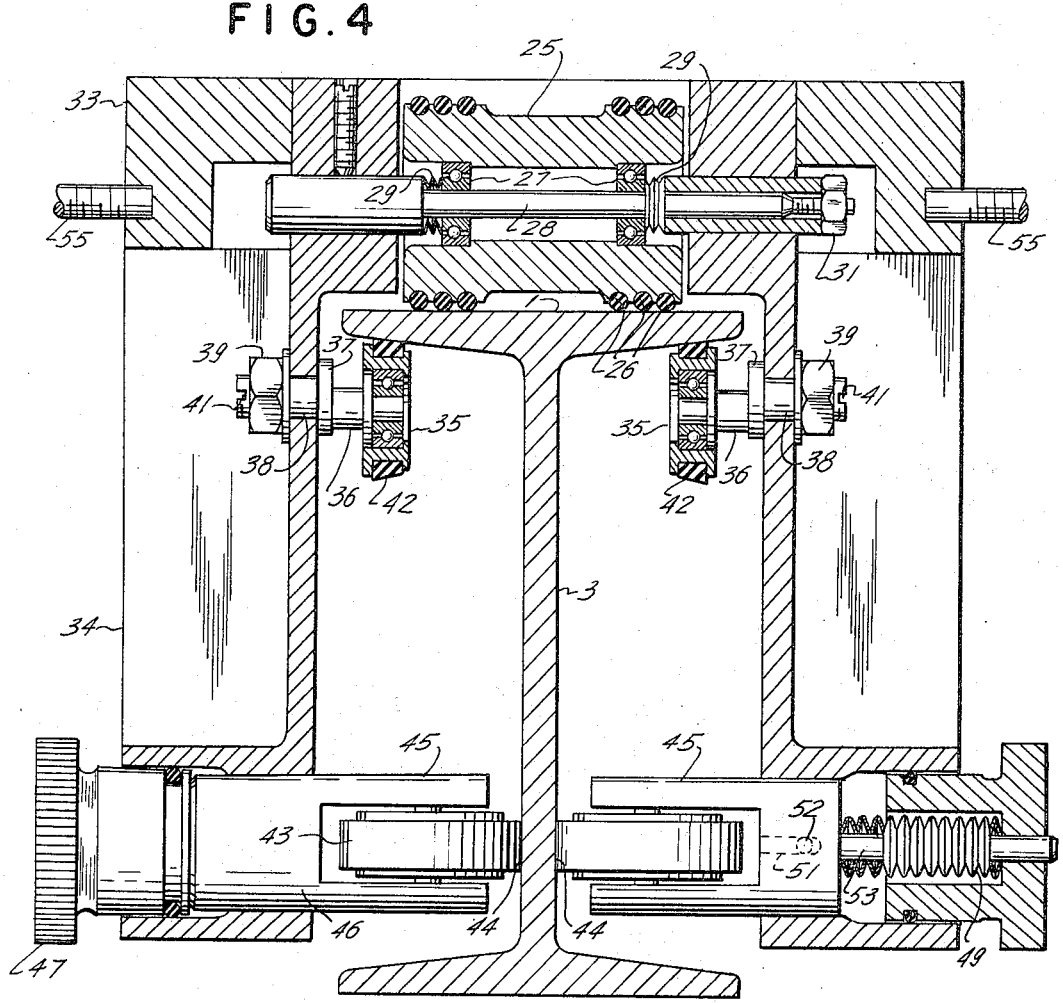
FIGURE 4 is a sectional view of the camera dolly and rail track shown in FIGURE 3 taken at 4—4.

It is to be noted that one of said second guide wheels of each U-shaped member 23 is provided with biasing means 49 to hold its rolling surface 44 in continual contact with web 3. This is particularly advantageous in maintaining proper contact when the track is a curved member. Even for straight track sections, it is advantageous in reducing wobbling of the dolly as it traverses the track. In FIGURE 4, it can be seen that the bifurcate end 45 of support 46 is slotted at 51 so that it cooperates with pin 52 on shaft 53. This permits the bifurcate end to slide towards and away from the track web 3 along shaft 53. Spring 49 is provided so that in its normal position, wheel surface 44 is held in contact with web 3.

Figure 3:
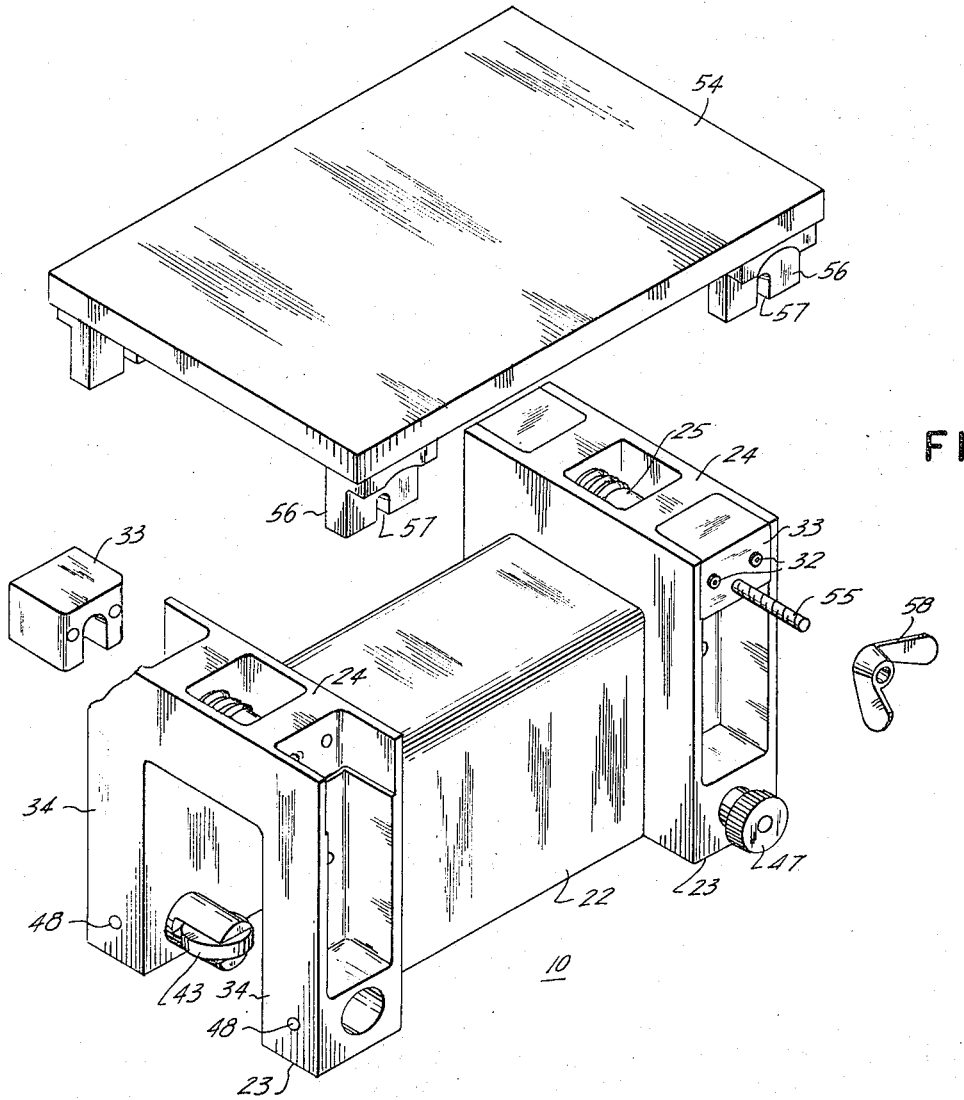
FIGURE 3 is an isometric and partially exploded view of the camera dolly shown in FIGURE 1.

The camera dolly is provided with a removable top plate 54 as shown in FIGURE 3. Blocks 33 are provided with threaded studs 55 extending substantially transverse to the direction of dolly travel. Top plate 54 is provided with a plurality of tabs 56 depending therefrom, each having a cutout 57. To assemble the top plate to the upper part of the dolly, the plate is positioned so that cutouts 57 embrace the studs 55. Wing nuts 58 are then tightened, holding plate 54 securely, but removably, in place. Suitable means (not shown) hold a motion picture camera on the top plate 54.

Various other modifications and extensions of this invention will become apparent to those skilled in the art. For example, while the particular embodiment of the dolly described herein is intended to be pushed along the track by a camera operator, it is within the spirit of the invention to provide motor means for mechanically moving the dolly along the track. Also, while this description has been in terms of a dolly for a motion picture camera, it is clear that the same dolly could support other apparatus, such as a television camera or even a man to operate a camera moving along a parallel track. All such variations and deviations which basically rely on the teachings through which this invention has advanced the art are properly considered within the spirit and scope of the invention.

What is claimed is:

1. A dolly for supporting a camera or the like comprising a U-shaped channel member with a U-shaped flange-like member at each end thereof, each flange-like member comprising a crosspiece and two side leg members depended from said crosspiece, a main load carrying wheel mounted in each of said crosspieces, first guide wheels mounted on axles substantially transverse to said leg members, means for adjusting the positions of said first guide wheels with respect to said crosspieces and said leg members, second guide wheels mounted on axles substantially transverse to said crosspieces and means for adjusting the position of said second guide wheels with respect to said leg members.

2. A dolly according to claim 1 wherein each of said axles of said first guide wheels is connected to a shaft by means of a connecting link so that the axis of rotation of said axle is substantially parallel to but disposed from the axis of rotation of said shaft.

3. A dolly according to claim 2 wherein means are provided for longitudinally and rotationally adjusting said shaft.

4. A dolly according to claim 1 wherein at least one of said second guide wheels is spring-biased so that when the dolly runs along a track extending between said leg members of said dolly, said spring-biased wheel will always be in contact with said track.

5. Camera-supporting means comprising a dolly according to claim 1 for running along an I beam track, an I beam track extending between said leg members of said dolly, means for supporting said I beam track above the ground and means for adjusting the relative angle between said I beam track and the ground.

6. Camera-supporting means according to claim 5 in which the I beam track comprises a plurality of separable sections of I beam track and means are provided on each of said sections for joining said section with an adjacent section.

References Cited

UNITED STATES PATENTS

| | | | |
|---|---|---|---|
| 709,685 | 9/1902 | Schutze | 104—93 |
| 828,409 | 8/1906 | Kazubek | 104—246 |
| 2,058,033 | 10/1936 | Perazzoli | 104—246 |
| 2,535,501 | 12/1950 | Loughridge | 308—62 X |
| 3,159,110 | 12/1964 | Wylie | 104—246 |

FOREIGN PATENTS 885,939  6/1943  France.

ROY D. FRAZIER, *Primary Examiner.*

D. DOMOTOR, *Assistant Examiner.*